United States Patent Office 2,883,439
Patented Apr. 21, 1959

2,883,439

ALKYLATION PROCESS

Milton M. Wald, Oakland, Calif., assignor to Shell Development Company, New York, N.Y., a corporation of Delaware No Drawing. Application May 21, 1957
Serial No. 660,458

13 Claims. (Cl. 260—671)

This invention relates to the alkylation of saturated hydrocarbons with olefinic hydrocarbons and is more particularly concerned with promoted alkylation.

Processes for the alkylation of paraffinic hydrocarbons with olefins are well known in the art. Great commercial importance has been achieved by acid-catalyzed processes for the alkylation of isoparaffins with olefins. Catalysts for these alkylation processes are mineral acids, such as sulfuric acid and hydrofluoric acid. Other acidic materials, e.g., aluminum chloride, may also serve as catalysts. In general, the systems utilizing acidic catalysts are heterogeneous. They may also be homogeneous, e.g., when aluminum bromide is used in a liquid system.

It is also known to conduct the alkylation of paraffins with olefins thermally, at temperatures of 500° C. and higher and pressures of over 4000 p.s.i.g. Thermal alkylation is not today practiced commercially, although the reaction may occur to some extent in so-called thermal polymerization processes in which, for example, mixed paraffinic and olenic feeds of three to four carbon atoms per molecule are exposed to temperatures of 500°–600° C. at pressures above 1000 p.s.i.g.

It has been proposed to promote the alkylation of paraffins with olefins by certain so-called homogeneous catalysts to be used in vapor phase. Specifically, organic halogen compounds and organic nitro compounds have been proposed for use as such catalysts. These homogeneously catalyzed alkylation processes have not found commercial acceptance. The homogeneous catalysts proposed heretofore have a variety of shortcomings. For example, many of the compounds are relatively expensive; many are quite corrosive; and many are difficult to remove from the alkylation products. Generally, the catalysts can not be recovered and reused. This makes most, if not all, the previously-proposed compounds too expensive for commercial use.

The previously-proposed so-called homogeneous catalysts have the further disadvantage that, in alkylation of a paraffin with an olefin, they lead to the formation of a relatively high proportion of a saturated product which is not the product of reaction between the originally charged paraffin and olefin, but is the product of reaction of molecules of the originally charged olefin with other molecules thereof, ultimately saturated by a transfer of hydrogen atoms. In the production of gasoline, the saturated hydrocarbons produced by interreaction of the olefins are generally of much lower octane number than the true alkylation product.

It is an object of the present invention to provide an efficient process for alkylating saturated hydrocarbons with olefinic hydrocarbons. Another object of this invention is to provide an efficient process for alkylating saturated aliphatic hydrocarbons with unsaturated aliphatic hydrocarbons to produce high yields of high octane gasoline. A more specific object is to provide a process for alkylating isobutane with ethylene or propylene to produce high yields of high octane gasoline. Another object of this invention is to alkylate higher paraffinic hydrocarbons, e.g., waxes, with lower olefins, e.g., ethylene, to produce alkylation products having modified properties. Another object is to alkylate the alkyl portion of aryl-substituted alkanes (cyclic or noncyclic) with olefins. Other objects and advantages of the present invention will become apparent to those skilled in the art from the following description.

It has now been found that certain compounds not recognized by the prior art for the purpose are especially suitable and advantageous non-acidic promoters of alkylation. These compounds are the sulfhydryl compounds. They are superior in that they lead to the production of a liquid product containing an especially high ratio of the alkylate to the homo reaction product of the olefins. Further, $H_2S$ and some organic sulfhydryl compounds are readily and cheaply available in the ordinary petroleum refinery. They are relatively non-corrosive, and are readily removed from the resulting alkylate.

Broadly stated, this invention is a process for alkylating saturated hydrocarbons, particularly paraffins, including aryl-substituted paraffins, with olefinic hydrocarbons, which comprises contacting the saturated and the olefinic hydrocarbons in a reaction zone under alkylating conditions with a small amount of an alkylation promoter consisting essentially of a sulfhydryl compound. Preferably the promoter forms with the hydrocarbon reactants a single homogeneous phase at the alkylation conditions of the reaction zone.

A number of advantages of the so-called homogeneous catalysis of alkylation have been described in the prior art. All of these advantages may be realized in the process of the present invention. Thus, the present invention permits the alkylation of normal as well as isoparaffinic hydrocarbons with olefins. Relatively low temperatures are employed compared to the non-catalytic thermal alkylation. Intimate contact is easily obtained in homogeneous as contrasted to heterogeneous catalysts.

In addition to the previously-recognized advantages of the so-called homogeneous alkylation, the present invention permits the promotion of alkylation with a readily-available relatively non-corrosive material and permits the production of a higher proportion of the desired reaction product of paraffin and olefin than is possible in the un-promoted thermal alkylation or found in the alkylation promoted by the non-acidic catalysts known to the prior art.

A significant difference between the alkylation process of this invention and the acid-catalyzed alkylation processes is that the alkylation product itself is of a different chemical nature. For example, in the acid catalyzed alkylation of isobutane with ethylene, which can be carried out over aluminum chloride catalyst, the predominant alkylation product is 2,3-dimethylbutane also known as diisopropyl. By contrast, the alkylation of isobutane with ethylene according to the present invention leads to the formation of 2,2-dimethylbutane, also known as neohexane, to the substantial exclusion of diisopropyl. When reacting isobutane with propylene by means of acidic alkylation catalysts, the predominant alkylation products are 2,3-dimethylpentane and 2,4-dimethylpentane. In the alkylation of isobutane with propylene in accordance with this invention the predominant alkylation product is 2,2-dimethylpentane.

In general, the product of alkylation in this process is the result of the least substituted carbon of the double bond being joined directly to a tertiary carbon atom of an isoparaffin or to a secondary carbon atom of a normal paraffin. The resulting products are recovered as such from the reaction.

In the broadest aspect, the alkylation promoters of this invention are sulfhydryl compounds i.e. compounds having the formula RSH, where R stands for hydrogen or for an organic group which may be an alkyl or aryl group or a substituted alkyl or aryl group. All sulfhydryl compounds are not full equivalents of one another as alkylation promoters according to this invention. Thus, it has been found that thiophenol is substantially superior to methyl mercaptan and to hydrogen sulfide. For any given type of sulfhydryl compound, however, the simplest ones will ordinarily be preferred because they serve the purpose adequately and are more readily and cheaply available than more complex compounds. Thus, thiophenol is a preferred alkylation promoter in the process of this invention and $H_2S$ and methyl mercaptan are also quite suitable. Other suitable sulfhydryl compounds are, for example, the mercaptans in which R represents an alkyl group such as ethyl, propyl, isopropyl, n-butyl, sec. butyl, tert. butyl, and the various forms of amyl, hexyl, octyl, decyl, dodecyl and similar alkyl groups. More preferred sulfhydryl compounds are the thiophenols in which R represents tolyl, xylyl or other polymethylphenyl groups or other phenyl groups having from one to five nuclear alkyl substituents of from one to four carbon atoms, each. Other suitable sulfhydryl compounds are mercaptans in which R represents a cycloalkyl group or substituted cycloalkyl group such as cyclopentyl, cyclohexyl and alkyl-substituted cyclopentyl and cyclohexyl groups such as those having from one to five nuclear substituents of from one to four carbon atoms each. All of the above-named organic compounds are hydrocarbylthiols, i.e. compounds in which R represents a monovalent hydrocarbon radical.

Although hydrogen sulfide and the hydrocarbylthiols are preferably used in the process of this invention because of their relative availability and cheapness, thiols may be used in which R represents an alkyl, cycloalkyl or aryl group having heterogeneous substituents, such as: thioacids

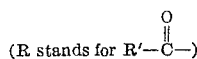

(R stands for R'—C—)

e.g., thioacetic acid; mercapto-carboxylic acids (R stands for —R'—COOH), e.g., mercaptoacetic acid, thioglycolic acid; substituted thiophenols, e.g., p-methoxythiophenol, and so forth. 2-mercaptobenzothiazole is suitable.

The sulfhydryl compounds employed as promoters need not be pure compounds but may be mixtures of sulfhydryl compounds, e.g., a mixed mercaptan and/or thiophenol fraction recovered in the extractive sweetening of sour petroleum distillate fractions, such as liquefied petroleum gasses, gasoline or kerosene. In the simple caustic washing of light petroleum fractions including gasoline, hydrogen sulfide and the lower mercaptans up to about butyl mercaptan are readily removed due to their solubility in caustic and may be recovered from the caustic by a suitable treatment, such as steaming.

The alkylation promoters of this invention may be solids, liquids or gases under normal conditions.

Preferred sulfhydryl compounds for use in this process are $H_2S$ and those organic compounds having from one to fifteen carbon atoms per molecule and having such volatility or solubility that they exist in the same phase as the reactants under alkylation conditions.

The amount of sulfhydryl compound used in the process of this invention varies from about 0.1 to about 5 mole percent based on the total hydrocarbon charge. It is preferably between about 0.4 and about 1.4 mole percent. For a given system of hydrocarbon reactants and alkylation conditions there is generally an optimum range of the amount of promoter to be employed which leads to best results. Use of insufficient or excessive amounts of promoter tends to favor the production of undesired reaction products of the olefins at the expense of the desired alkylate.

The saturated, i.e. non-olefinic, hydrocarbon component of the reaction mixture may be any saturated hydrocarbon having three or more carbon atoms per molecule. Normal and branched paraffins are particularly suitable. Fully or partially hydrogenated non-olefinic cyclic hydrocarbons may also be alkylated in accordance with this process. This includes cylopentane, cyclohexane, their alkyl derivatives, decalin, tetralin and others.

The olefinic reactant may be any olefinic hydrocarbon having two or more carbon atoms per molecule. Non-conjugated olefins, and particularly mono-olefins are preferred. Ethylene and propylene are particularly suitable and are especially preferred in many cases, but higher olefins, e.g., butene-1, butene-2, isobutene, the normal and branched pentenes, hexenes, heptenes, octenes and higher olefins may also be employed as alkylating agents.

When the alkylation process is carried out for the purpose of producing gasoline, the preferred saturated reactant is isobutane and the most preferred olefin reactant is propylene. Ethylene or mixed butenes are also very suitable olefin feed stocks in the alkylation of isobutane. Other suitable paraffinic feed stocks for the production of motor gasoline are propane, n-butane and the pentanes, particularly isopentane. n-Hexane and methylpentanes are also suitable, especially when the olefin is ethylene or propylene.

Long-chain paraffins having from about fifteen to about thirty carbon atoms per molecule are very suitable feed components for a liquid phase alkylation, particularly with ethylene.

Aryl-substituted alkane hydrocarbons suitable for alkylation include toluene, the polymethylbenzes, ethylbenzene, polyethylbenzenes, other alkylbenzenes and polyalkylbenzenes, e.g., cumene and polyisopropylbenzenes, alkyl- and polyalkylnaphthalenes, and so forth.

The temperatures used in the alkylation reaction zone of this invention are in the range from 200° to 510° C., inclusive. The preferred temperatures are in the range of from 300° to 450° C. At the higher temperatures in the given range the higher pressures in the range specified below are necessary.

Reaction times are generally in the range of from one-half hour to twenty hours. Longer reaction times are not required. Shorter ones may be employed, down to five to ten minutes. The shorter times are useful at the higher temperatures in the ranges given.

The pressures used in the alkylation reaction zone of this invention are in the range of from about 650 p.s.i.g to about 15,000 p.s.i.g. or more and preferably from about 750 p.s.i.g. to about 2,500 p.si.g.

As in other alkylation processes, the selectivity to the desired alkylation product is increased by maintaining a relatively high ratio of the paraffin to the olefin in the alkylation reaction zone. The molar ratio of saturated hydrocarbon to olefinic hydrocarbon should be at least about 1:1 and is preferably in the range from 2:1 to 10:1. Higher ratios may be employed.

The process of the invention may be carried out in batch or in continuous reaction systems. In a batch system the reaction mixture of saturated and olefinic hydrocarbon and sulfhydryl compound is charged to a reaction vessel, e.g., an autoclave, where it is rapidly heated to reaction conditions of temperature and pressure. It is also convenient to inject additional olefin and, sometimes, additional sulfhydryl compound into the mixture during the course of the reaction.

In a continuous reaction system, a mixture of saturated and olefinic hydrocarbon and sulfhydryl compound is passed through a reaction zone which may be, for example, a series of chrome-steel or chrome-nickel steel tubes in a furnace, maintained at the desired reaction temperature and pressure. There may be a soaking zone such as a drum, following the tubular heater.

When the reaction is completed, either in a batch or continuous system, the reaction mixture is treated to recover the desired product. For example, in the production of gasoline by alkylation of hydrocarbons having three and four carbon atoms per molecule, the reaction product is fractionated to stabilize it by removing the normally gaseous hydrocarbons, which may be returned to the reaction zone. A liquid alkylate fraction of the desired boiling range is recovered as a gasoline product.

In the production of gasoline hydrocarbons, the sulfhydryl compound chosen preferably boils outside the gasoline boiling range. For example, when $H_2S$ or methyl mercaptan is employed, the residual promoter is withdrawn with the gaseous portion of the reactor effluent. In such a case the liquid alkylation product needs no further treatment to be suitable for use as a gasoline. Where portions of the promoter are present in the gasoline reaction product, the latter may be subjected to a conventional treating or sweetening operation, such as caustic washing, Doctor sweetening, solutizer sweetening, hypochlorite sweetening or other known methods. If an extractive method is employed coupled with non-oxidative solvent regeneration, the sulfhydryl compounds recovered from the sweetening process are suitably separated and used as promoter in the alkylation reaction.

The following examples are illustrative of the present invention but are not to be considered as limiting thereon:

EXAMPLE I

Run No. 1, a typical run in accordance with the present invention, was made in the following manner: A sealed frangible vial containing a weighed amount of thiophenol was placed in a stainless steel rocking autoclave, which was then closed, evacuated and weighed. Isobutane was then admitted by direct connection to a tank while the vessel was chilled in ice. The vessel was allowed to warm to room temperature and was again accurately weighed. Ethylene was then admitted by direct connection to a cylinder and after ethylene addition was completed the vessel was again weighed. The vial of thiophenol was then broken and the autoclave was rapidly heated to a temperature of 400° C., at which temperature it was maintained for a period of eight hours. The pressure in the vessel at reaction conditions was approximately 1000 p.s.i.g. In this run, the mole ratio of isobutane to ethylene was 2.2:1 and the amount of thiophenol expressed as mole percent based on the total hydrocarbons, was 1.1%.

After completion of the reaction the vessel was cooled to room temperature, weighed to insure absence of loss due to leakage, and evacuated by connecting it through a series of cold traps to a gas holder. Complete removal of product from the autoclave was insured by heating the vessel to 120°–140° C. at 1 mm. pressure. The recovered liquid and gas were analyzed chromatographically. After removal of all product from autoclave was again weighed and the increase in weight reported as residue.

The product distribution observed in Run No. 1 is reported in Table I. In this run 96.3% by weight of the charge was accounted for in the recovered material. Conversion of ethylene was 80.6%; conversion of isobutane was 27.1%.

Table I
PRODUCT DISTRIBUTION IN RUN NO. 1

| Product | | Selectivity, Moles per 100 Moles $C_2H_4$ Reacted | Percent by Wt. based on total Hydrocarbons Charged | Product Composition, percent by Wt. based on total Product |
|---|---|---|---|---|
| Carbon Number | Compound | | | |
| 1 | Methane | 0.9 | 0.05 | 0.2 |
| 2 | Ethane | 4.3 | 0.7 | 2.1 |
| 3 | | 1.1 | 0.3 | 0.8 |
| 4 | (Excluding Isobutane) | a 4.3 | a 1.2 | 3.9 |
| 5 | | 1.2 | 0.3 | 1.0 |
| 6 | 2,2-Dimethylbutane | 49.2 | 22.0 | 58.4 |
| 6 | 2,3-Dimethylbutane | 0 | 0.0 | 0 |
| 6 | 2-Methylpentane | 2.8 | 1.2 | 3.9 |
| 8 | 2,2-Dimethylhexane | 4.5 | 2.7 | 8.3 |
| | Unidentified $C_8$ and Heavier, Wt. Percent | | 6.6 | 19.8 | a Most of reported $C_4$ was in original feed.

The data in the last column of Table I show that 58.4% by weight of the total product was 2,2-dimethylbutane and that no 2,3-dimethylbutane was observed. The recovered ethane is a reaction product of the feed ethylene. The material of four carbon atoms per molecule is mainly n-butane and isobutene which were present as impurities in the feed. The only substantial amount of identified liquid product other than 2,2-dimethylbutane is 2,2-dimethylhexane, which occurred as about 8.3% by weight of the total product; an unidentified $C_8$ and heavier organic product occurred in about 12% concentration. The latter appears to be predominantly or entirely the product of the polymerization of ethylene, saturated by a subsequent hydrogen exchange.

EXAMPLE II

Run No. 2 was carried out in a similar manner to run No. 1 but using, instead of thiophenol, nitromethane, a "homogeneous catalyst" of the prior art. The run was carried out at 370° C. with a reaction time of one hour. The isobutane to ethylene mole ratio was 2.5:1. The conversion of ethylene was 53.9% while that of isobutane was 5.8%. The selectivity (moles product per 100 moles $C_2H_4$ reacted) to 2,2-dimethylbutane was only 6.5% in this run; that to 2,2-dimethylhexane was 1.6%. The amount of unidentified $C_8$ and heavier organic product was 4.9% by weight, based on total hydrocarbon charged. No significant amount of 2,3-dimethylbutane was found.

EXAMPLE III

Runs Nos. 3 and 4 were carried out in a similar manner to run No. 1 described in Example I, but with different reaction times. The conditions under which these runs were carried out and the conversion of olefin and selectivity to 2,2-dimethylbutane are given in Table II.

Table II

| Run Number | 1 | 3 | 4 |
|---|---|---|---|
| Isobutane: Ethylene Mole Ratio | 2.2 | 2.0 | 2.1 |
| Promoter | Thiophenol | Thiophenol | Thiophenol |
| Concentration, Mole Percent | 1.1 | 1.1 | 1.0 |
| Conditions: | | | |
| Time, Hrs | 8 | 2 | 1 |
| Temp., ° C | 400 | 400 | 400 |
| Pressure, p.s.i.g | ca. 1,000 | ca. 1,000 | ca. 1,000 |
| Conversion: Percent of Olefin Converted | 80.6 | 49.9 | 43.1 |
| Selectivity, Mole Percent: | | | |
| Ethane | 4.3 | 3.2 | 2.6 |
| 2,2-Dimethylbutane | 49.2 | 48.5 | 47.1 |
| 2,2-Dimethylhexane | 6.1 | 5.8 | 4.5 |
| Unidentified $C_8$ and Heavier | 3.9 | 3.1 | 4.2 |

The results from runs Nos. 1, 3 and 4, shown in Table II, illustrate the effect of changing the reaction time from eight hours to one hour at 400° C. The selectivity to 2,2-dimethylbutane remained essentially unchanged and the conversion to ethane and to 2,2-dimethylhexane decreased somewhat as the contact time was decreased. The overall ethylene conversion was substantially higher in the eight-hour run than in the two-hour run and dropped still further in the one-hour run.

EXAMPLE IV

Runs Nos. 5 through 7 were carried out in a manner similar to run No. 1 described in Example I, but with the addition of a small amount of an alkyl phenyl ether which was found to be substantially inert with respect to the reaction and, in the case of runs Nos. 6 and 7, with the use of methyl mercaptan and hydrogen sulfide, respectively, in place of thiophenol. The conditions under which these runs were carried out and the conversion of olefin and selectively to 2,2-dimethylbutane are given in Table III.

Table III

| Run Number | 3 | 5 | 6 | 7 |
|---|---|---|---|---|
| Isobutane: Ethylene, Mole Ratio | 2.0 | 2.4 | 2.0 | 1.7 |
| Promoter | Thiophenol | Thiophenol | Methyl Mercaptan | $H_2S$ |
| Concentration, Mole Percent | 1.1 | 1.0 | 0.77 | 1.55 |
| Conditions: | | | | |
| Time, Hrs | 2 | 2 | 2 | 2 |
| Temp., °C | 400 | 400 | 400 | 400 |
| Pressure, p.s.i.g | ca. 1,000 | ca. 1,000 | ca. 1,000 | ca. 1,000 |
| Conversion: Percent of Olefin Converted | 49.9 | 54.5 | 62.6 | 63.2 |
| Selectivity, Mole Percent: | | | | |
| Ethane | 3.2 | 2.8 | 2.8 | 4.7 |
| 2,2-dimethylbutane | 48.5 | 50.5 | 28.2 | 35.3 |
| 2,2-dimethylhexane | 5.8 | 5.4 | 5.6 | 5.1 |
| Unidentified $C_8$ and Heavier, Wt. Percent | 3.1 | 4.9 | 6.4 | 7.6 |

Runs Nos. 3 and 5, shown in Table III, were made under otherwise similar conditions except that in run No. 5 a small amount of alkyl phenyl ether was added. This addition had at most only a slight effect on the results of the reaction, in that run No. 5 shows a slightly higher ethylene conversion and a very slightly higher selectivity to 2,2-dimethylbutane.

Runs Nos. 5 through 7 illustrate the relative efficiency of thiophenol, methyl mercaptan and hydrogen sulfide. In the runs carried out with the latter two alkylation promoters the ethylene conversion was higher but the selectivity to 2,2-dimethylbutane was lower, than in the corresponding run with thiophenol. In each case, however, the selectivity to 2,2-dimethylbutane is several times as high as the selectivity obtained in run No. 2 of Example II in which nitromethane was used as the added material.

EXAMPLE V

Run No. 8 was carried out in a manner similar to run No. 1 described in Example I, but n-butane was used as the saturated hydrocarbon feed component instead of isobutane. The conditions under which run No. 8 was carried out and the conversion of olefin and selectivity to several products are given in Table IV.

Table IV

| Run Number | 8 |
|---|---|
| n-Butane: Ethylene, Mole Ratio | 2.4 |
| Promoter | Thiophenol |
| Concentration, Mole Percent | 1.1 |
| Conditions: | |
| Time, Hrs | 2 |
| Temp., °C | 400 |
| Pressure, p.s.i.g | ca. 1,000 |
| Conversion: | |
| Percent of Ethylene Converted | 47.8 |
| Percent of n-Butane Converted | 13.6 |
| Selectivity, Mole Percent: | |
| Ethane | 5.6 |
| 3-Methylpentane | 33.7 |
| n-Hexane | 7.3 |
| Unidentified Single $C_8$ [a] | 7.7 |
| Unidentified $C_8$ and Heavier, Wt. Percent | 7.3 |

[a] May be 3-methylheptane.

The predominant product in this run was 3-methylpentane which occurred in substantial concentration. This run demonstrates not only the reactivity of n-paraffins but also shows that, as in the case of isobutane, the hydrogen on the more highly substituted carbon atom(s) of the paraffin is selectively attacked in the alkylation.

EXAMPLE VI

A run was made in a manner similar to run No. 1 of Example I but using propylene as the reactive olefin. The temperature was 350° C., the reaction time twelve hours, and the isobutane-to-propylene ratio 2.2:1. The promoter was thiophenol, employed in a concentration of 1.0 mole percent, based on total hydrocarbons. The major reaction product was 2,2-dimethylpentane; methylcyclopentane and other $C_6$ and $C_7$ hydrocarbons were also identified in the total product.

EXAMPLE VII

When toluene is employed as the saturated feed component in a run carried out similar to run No. 1 of Example I, at a temperature of 400° C., a reaction time of two hours and a toluene-to-ethylene mole ratio of about 2.5:1, the major reaction product is n-propylbenzene.

EXAMPLE VIII

When isobutane is alkylated with propylene in a manner similar to that described in Example I, but employing a temperature of 225° C., the pressure which must be employed to obtain at least 75% conversion of propylene is at least about 8 p.s.i.a. At such a low pressure and temperature, however, the reaction rate is much too low to be useful and a pressure of at least 650 p.s.i.g. is, therefore, employed. The minimum pressure required for 75% conversion at 325° C. is about 300 p.s.i.g.; here again, at least 650 p.s.i.g. is employed to bring up the rate. At 425° C. the minimum pressure is 4,200 p.s.i.g. and at 525° C. it is 26,500 p.s.i.g.

When isobutane is alkylated with ethylene at similar conditions, the minimum pressure is lower, in each case, than that required with propylene When the olefin is butylene or higher, the corresponding minimum pressures are somewhat higher.

When propane is used instead of isobutane, the minimum pressures are, again, somewhat lower than corresponding pressures for isobutane. Similarly, when the saturated compound is heavier than isobutane the minimum pressure is somewhat higher in each case.

I claim as my invention:

1. A process for alkylating a first hydrocarbon of the group consisting of saturated hydrocarbons and aryl substituted alkanes with an olefinic hydrocarbon which comprises exposing a reaction mixture containing in homogeneous phase at least about one mole of saturated hydrocarbon per mole of olefinic hydrocarbon and from 0.1 to 5 mole percent, based on total hydrocarbons, of a hydrosulfuryl compound of the group consisting of hydrogen sulfide and hydrocarbylthiols as the sole alkylation catalyst to a reaction temperature of at least about 200° C. and below that at which substantial thermal cracking of said hydrocarbons takes place at a pressure of at least about 650 p.s.i.g., higher pressures being employed at higher temperatures in the stated range.

2. A process in accordance with claim 1 in which said first hydrocarbon is a paraffin.

3. A process in accordance with claim 1 in which said first hydrocarbon is an aryl-substituted paraffin.

4. A process in accordance with claim 1 in which said hydrosulfuryl compound is an arylthiol.

5. A process according to claim 1 in which said hydrosulfuryl compound is an alkylthiol.

6. A process in accordance with claim 1 in which said hydrosulfuryl compound is $H_2S$.

7. A process for the production of gasoline boiling range hydrocarbons which comprises exposing a reaction mixture containing a paraffinic hydrocarbon having from three to six carbon atoms per molecule and an olefinic hydrocarbon having from two to five carbon atoms per molecule, in a ratio of at least about one mole of paraffin per mole of olefin and from 0.1 to 5 mole percent, based on total hydrocarbons, of a hydrosulfuryl compound of the group consisting of hydrogen sulfide and hydrocarbylthiols as the sole alkylation catalyst, in vapor phase to a reaction temperature of at least about 200° C. and below that at which substantial thermal cracking of said hydrocarbons takes place at a pressure of at least about 650 p.s.i.g., higher pressures being employed at higher temperatures in the stated range.

8. A process in accordance with claim 7 in which the hydrosulfuryl compound is an arylthiol and the paraffin is an isoparaffin.

9. A process for the production of gasoline boiling range hydrocarbons which comprises exposing a reaction mixture containing isobutane and an olefin having from two to three carbon atoms per molecule in a ratio of at least two moles of isobutane per mole of olfien and containing from 0.1 to 5 mole percent of hydrogen sulfide, in vapor phase, to a reaction temperature in the range between 300° and 450° C. at a pressure of at least about 650 p.s.i.g., higher pressures being employed at higher temperatures in the stated range.

10. A process in accordance with claim 7 in which said olefin is ethylene and in which the reaction product contains a substantial proportion of neohexane.

11. A process in accordance with claim 9 in which said olefin is propylene and in which the reaction product contains a substantial proportion of neoheptane.

12. A process for the production of a branched-chain hydrocarbon in the lubricating oil boiling range which comprises exposing a reaction mixture containing a long-chain paraffin having from fifteen to thirty carbon atoms per molecule and an olefinic hydrocarbon, in a ratio of at least two moles of paraffin per mole of olefin, and from 0.1 to 5 mole percent, based on total hydrocarbons, of a hydrosulfuryl compound of the group consisting of hydrogen sulfide and hydrocarbylthiols as the sole alkylation catalyst in liquid phase to a reaction temperature of at least about 200° C. and below that at which substantial thermal cracking of said hydrocarbons takes place at a pressure of at least about 650 p.s.i.g., higher pressures being employed at higher temperatures in the stated range.

13. A process for the production of gasoline boiling range hydrocarbons which comprises exposing a reaction mixture containing isobutane and an olefin having from two to three carbon atoms per molecule in a ratio of at least two moles of isobutane per mole of olefin and containing from 0.1 to 5 mole percent of hydrocarbylthiol in vapor phase, to a reaction temperature in the range between 300° and 450° C. at a pressure of at least about 650 p.s.i.g., higher pressures being employed at higher temperatures in the stated range.

References Cited in the file of this patent

UNITED STATES PATENTS

| | | |
|---|---|---|
| 2,238,594 | Malishev | Apr. 15, 1941 |
| 2,352,059 | Woog | June 2, 1944 |